United States Patent [19]
Looschen

[11] 3,742,459
[45] June 26, 1973

[54] DATA PROCESSING METHOD AND APPARATUS ADAPTED TO SEQUENTIALLY PACK ERROR CORRECTING CHARACTERS INTO MEMORY LOCATIONS

[75] Inventor: Floyd W. Looschen, Arcadia, Calif.

[73] Assignee: Burroughs Corporation, Detroit, Mich.

[22] Filed: Nov. 26, 1971

[21] Appl. No.: 202,342

[52] U.S. Cl. .................... 340/172.5, 340/146.1 AG
[51] Int. Cl. .......................................... G06f 11/10
[58] Field of Search ............... 340/172.5, 146.1 AG, 340/146.1 AL, 146.1 AQ; 235/153 R, 153 BB

[56] References Cited

UNITED STATES PATENTS

| | | | |
|---|---|---|---|
| 3,432,812 | 3/1969 | **Elfant** | 340/172.5 |
| 3,434,116 | 3/1969 | **Anacker** | 340/172.5 |

OTHER PUBLICATIONS

C. V. Freiman et al., "Detecting Storage Address Failures With Data Parity" in IBM Technical Disclosure Bulletin; Vol. 12; No. 5; Oct., 1969; p. 652.

*Primary Examiner*—Paul J. Henon
*Assistant Examiner*—Melvin B. Chapnick
*Attorney*—Leo J. Young

[57] ABSTRACT

A memory has a plurality of addressable locations each having a fixed number of bit storing devices. A data processor produces data units along with raw address information to point to memory locations that will store the data units. An error correcting character is produced to accompany each data unit. The error correcting character has a shorter field length than the data unit. Apparatus responsive to the raw address information produces an actual memory address to select a location for storing each data unit. The apparatus also selects another location and a subset of the bit storing devices therein for storing the accompanying error correcting character. By selecting different subsets of bit storing devices, the apparatus operates to pack a plurality of error correcting characters together in the same location.

18 Claims, 6 Drawing Figures

MEMORY USAGE WITH PACKING

MEMORY USAGE WITHOUT PACKING

MEMORY USAGE WITH PACKING

Patented June 26, 1973 3,742,459

5 Sheets-Sheet 3

Patented June 26, 1973 3,742,459

5 Sheets-Sheet 5

DATA PROCESSING METHOD AND APPARATUS ADAPTED TO SEQUENTIALLY PACK ERROR CORRECTING CHARACTERS INTO MEMORY LOCATIONS

BACKGROUND OF THE INVENTION

1. Field of the Invention

This invention relates to data processing systems and, more specifically, to a method and apparatus for packing characters into memory locations of the system memory.

2. Description of the Prior Art

A random access memory for a data processing system comprises a plurality of addressable locations each of which has a predetermined number of bit cells or storage devices such as magnetic cores, thin films, flipflops or the like. Random access means that a device such as a data processor which seeks to communicate with the memory is able to make access as quickly with one memory location as any other. During a memory access one of the memory locations is selected by address information and data is either written into or read from the addressed location in parallel. Since there are only a finite, predetermined number of bit cells in a memory location the data that can be stored therein is limited to a maximum field length. The term memory word is frequently used to mean an ordered set of binary signals having a field length that does not exceed this maximum field length.

Occasionally, faulty operation of the memory causes one or more of the bits within the memory word to be in error. It is therefore common to provide some means for detecting and, if possible, for correcting the error. For example, many memories have been built to include an extra bit cell in each location for storing a parity bit. Techniques are known for comparing the state of the parity bit with the content of the remainder of the memory word to determine whether there is an error.

Other memories have been suggested which would include a plurality of extra bit cells in each location for storing a coded error correcting character. An error correcting character encoded according to a Hamming Code for instance enables the correction as well as the detection of single bit errors.

Instead of increasing the memory word length as described above, another approach taken in the past has been to provide parallel memories; one for storing actual data and the other for storing error correcting characters. In such a system the processor couples similar address information to the parallel memories and corresponding locations are selected.

In one prior art approach using parallel memories, each of the parallel memories is identified with one and only one bit position. The most significant bit of a memory word is always stored in the first parallel memory, the next most significant bit is always stored in the second parallel memory, and so forth. Extra bits, stored in extra parallel memories, provide for error correction. An address signal having two fields is used for reading and writing. The first field selects the same relative location in each of the parallel memories; the second field selects the same relative bit position within a location.

From the foregoing description of prior art memory organizations it can be appreciated that a certain amount of memory capacity has been dedicated exclusively to the storage of either parity bits or error correcting characters. Of course whenever a particular resource within a data processing system is bound or exclusively dedicated to one particular function there is a serious loss of flexibility. Because of the great variety in the types of data formats that must be handled by a general purpose data processor, it is particularly undesirable to foreclose the possibility of the processor storing actual data instead of error correcting characters in a large number of bit cells in the memory. It would be advantageous to keep the memory organization flexible so that the bit cells that store error correcting characters during certain periods of operation would be available to store actual data during other periods of operation. However in the prior art organizations the extra bit cells are used only for storing error correcting bits and if not so used they are wasted.

Another problem with prior art memory system organizations becomes evident when it becomes necessary to make a design change after the memory has been built. Consider for example a situation in which the system memory is built with a predetermined number of bit cells per location including one cell for storing a parity bit to detect errors. If for some reason it becomes necessary to provide for error correction as well as error detection it is virtually impossible to install in each memory location the extra bit cells necessary for storing the extra bits required by an error correcting character. For this reason it has been necessary to substitute a wholly new memory for the old memory or at least to build a new memory to be used in parallel with the old memory as described above.

SUMMARY OF THE INVENTION

This invention is directed to a method and apparatus for a flexible memory system organization wherein the available memory capacity is efficiently used to store actual data and error correcting characters interchangeably. It is therefore a feature of an embodiment of the present invention that error correcting characters can be selectively used or unused without wasting available memory capacity. In contrast to prior art systems, an embodiment of the present invention can store error correcting characters without either increasing memory word length by adding extra bit cells to each location or adding a special parallel memory. Thus it is also a feature of the present invention that an existing data processing system can be provided with error correcting capabilities without adding extra bit cells to the existing memory capacity.

Briefly, an embodiment of the present invention comprises a memory having a plurality of addressable locations each having a predetermined number of bit cells and means for meshing or packing together in a memory location a plurality of characters respectively associated with a plurality of memory words stored in a plurality of other memory locations.

In a preferred embodiment the memory comprises a plurality of modules having interlacing capabilities that enable simultaneous access to a plurality of locations. Thus, during a single memory access cycle two separate locations are selected for access and both a memory word and its associated character are either written into or read from the memory substantially simultaneously.

The preferred embodiment also includes switching means for selectively enabling or disabling the writing, storage, and reading of the associated characters. Since none of the bit cells in the memory are exclusively dedicated to the storage of such characters, available memory capacity will not be wasted.

Briefly, a method in accordance with this invention involves the steps of producing an address signal pointing to a memory location; modifying the address signal to produce two different actual addresses, one for a word and one for an associated error correcting character; and writing the word and the character into these different actual addresses.

DETAILED DESCRIPTION OF A SPECIFIC EMBODIMENT

General Description of Operation

Figure 1A:
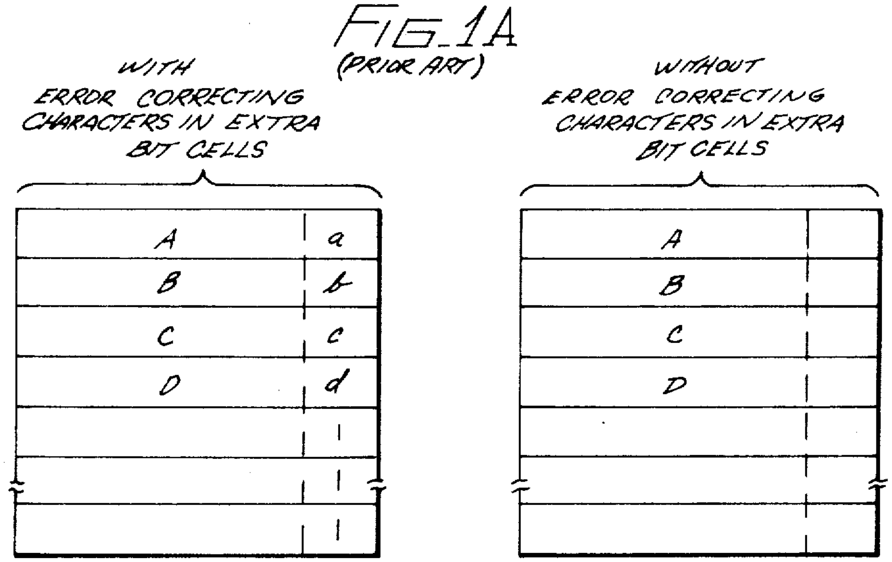
FIG. 1A (PRIOR ART)
FIG. 1A is a diagrammatic illustration of memory usage in memories without a character packing feature in accordance with the prior art.
Figure 1B:
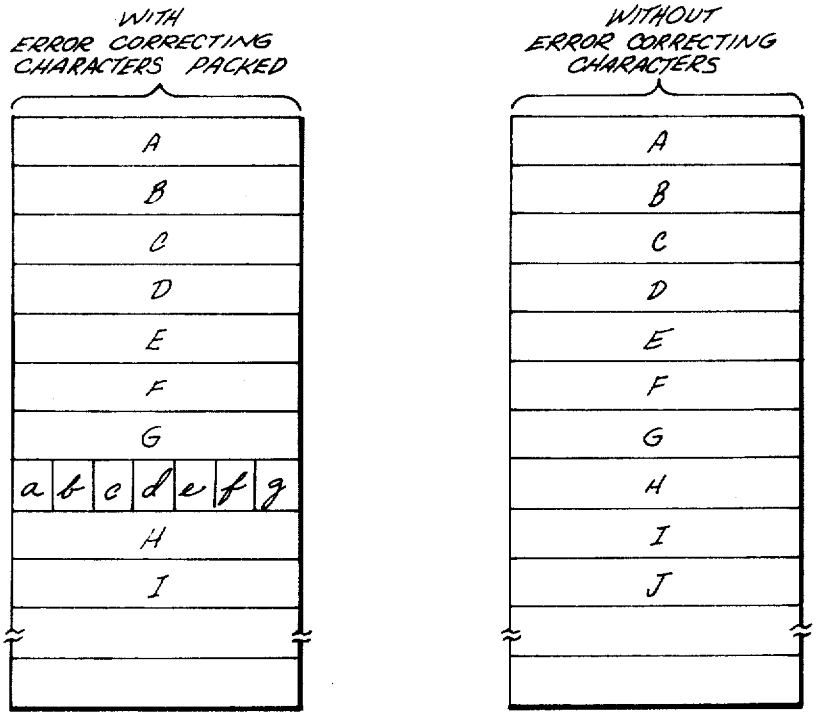
FIG. 1B is a diagrammatic illustration of memory usage in memories in accordance with the present invention.

FIG. 1 comprises FIGS. 1A and 1B and illustrates how information units each comprising a memory word and an associated error correcting character can be distributed in memory in various ways. In each case the memory is shown diagrammatically as a block comprising a linear array of memory locations. Each location comprises a predetermined number of bit cells. For simplicity the individual bit cells of the locations are not shown. Broken lines in the blocks suggest the existence of many locations which are not shown. The memory words are shown as the capital letters A, B, C, etc., and the corresponding error correcting characters are shown as small letters a, b, c, etc. Each error correcting character is associated with one memory word, and a memory word and its associated character are shown as the same letter. For example, memory word A is associated with error correcting character a.

FIG. 1A shows memory usage in a memory organization in accordance with the prior art having in each location extra bit cells which are exclusively dedicated to the function of storing error correcting characters. At the left of FIG. 1A there is illustrated a case of memory usage wherein error correcting characters are being used.

In the top location of the array, memory word A occupies the bit cells on the left side of the location, and its associated error correcting character a occupies the bit cells on the right side. Proceeding downwardly from the top location memory words B, C, and D and their associated error correcting characters b, c, and d occupy adjacent locations. A dash line within the block suggests the physical separation of the bit cells used for storing the memory words and the extra bit cells used for storing the error correcting characters.

At the right of FIG. 1A there is illustrated a case of memory usage wherein error correcting characters are not being used. As in the first case described above, memory words A, B, C and D occupy adjacent memory locations. However since error correcting characters are not being used the extra bit cells on the right of each location are unoccupied and are therefore wasted.

FIG. 1B shows memory usage in accordance with the present invention in a memory organization having means for packing a plurality of error correcting characters into a location. At the left of FIG. 1B there is illustrated a case wherein error correcting characters are being used, and at the right there is illustrated a case wherein error correcting characters are not being used. Although the invention is not limited thereto, in the specific examples shown herein, it is assumed that the field length of an error correcting character does not exceed one seventh of the memory words.

In the illustrative case wherein error correcting characters are being used, memory words A through G occupy seven consecutive memory locations proceeding downwardly from the top location of the array. In the next lower location, the error correcting characters a through g have been meshed or packed together one at a time. These error correcting characters occupy mutually exclusive subsets of the bit cells of this location. In the next lower locations memory words H, I. etc. are stored. Thus in circumstances wherein error correcting characters are used that have a field length not exceeding one seventh of the field length of a memory word, seven error correcting characters can be packed together in every eighth location. Therefore memory capacity is allocated such that seven-eighths of the memory stores memory words and one eighth of the memory stores error correcting characters.

In the case illustrated at the right of FIG. 1B error correcting characters are not used. Again proceeding downwardly from the top location is the memory array, words A through J are shown occupying adjacent locations. However, the eighth location is now available for storing a memory word because error correction is not being used. Therefore memory word H occupies this location instead of the packed together error correcting characters as in the preceding case. Thus it can be seen that no memory space is wasted as was the case when bit cells were exclusively dedicated to the storage of error correcting characters.

In a preferred embodiment of the invention, the fact that a memory word and its associated error correcting character are stored in different locations is transparent to the device communicating with the memory. That is, the communicating device produces a single address and requests either a read or a write operation. The actual addresses of the locations are automatically computed from the single address according to an algorithm. Many different algorithms can be devised, in accordance with the broader concepts of the present invention, for the calculation of the actual addresses. Factors to be considered in the selection of an appropriate algorithm are the relative dimensions of the memory word and the error correcting character; the speed, cost, and complexity of the circuitry required to implement the algorithm; and whether memory interlacing will be used. Memory interlacing is also used in the preferred embodiment of the invention. To that end, the memory comprises a plurality of independently operating memory modules. This enables a memory word to be exchanged with one memory module at the same time that its associated error correcting character is exchanged with another memory module.

The memory word comprises 42 bits and the error correcting character comprises six bits giving a word to character size ratio of 7 to 1. With this ratio, it is preferable to allocate the available memory capacity so that seven-eighths of the locations store memory words and one-eighth of the locations store error correcting characters. Seven error correcting characters are packed into a single location. Thus seven addressable sublocations are provided in each location storing error correcting characters.

The memory is partitioned into 32 memory modules each having 65,536 addressable word locations. A five bit address field is required to select one of the 32 modules and a 16 bit address field is required to select one of the 65,536 word locations within a module. Thus a total of 21 bits is required for a full address.

Consider now two notational systems which are used in expressing algorithms. The letter "A" is used herein to represent the address field. In the first notational system a field such as the address field is represented as A[*x* : *y*] *where A is the name of the field* (*or the name of the register storing the field*); *x* is the most significant digit place of the field; *y* is the length of the field; and zero origin indexing is implied. For example, the full 21 bit address field is represented as A[20:21]. The five most significant bits of the address field are represented as A[20:5]. This field is used for specifying one of the 32 memory modules. Of these 32 modules, 16 are identified as even modules and 16 are identified as odd modules. When A[16:1] is equal to a '0', then one of the even modules is specified; whereas when A[16:1] is equal to a '1', then one of the odd modules is specified.

The second notational system is an octal based notational system. In this octal notation, the full 21 bit address field is represented as $A_o = h_o i_o j_o k_o l_o m_o n_o$. Each letter in this notation represents one octal digit comprising three bits with $h_o$ being the most significant octal digit and $n_o$ the least significant.

The algorithm used in the preferred embodiment of this invention is an iterative algorithm in which address modification is repeated until a final address is calculated that does not have its least significant octal digit equal to seven. The algorithm provides a means for calculating $A_{df}$ which is the address of a location for storing the memory word; and $A_c$ and CN, which are the addresses of a word location and a sublocation (or character location), respectively, for storing an error correcting character.

In the following algorithm the symbol "$\leftarrow$" means "is assigned the value of;" the subscript "0" is used to indicate an unmodified address; the subscript "1" is used to indicate an address resulting from a first modification; and the subscript "i" is used to indicate an address resulting from i modifications.

In octal notation the algorithm is expressed in two parts.

A. Calculation of $A_{df}$, the address of a location for storing a memory word:

1. $A_1 = h_1 i_1 j_1 k_1 l_1 m_1 n_1 \leftarrow A_0 + h_0 i_0 j_0 k_0 l_0 m_0$
2. If $n_1 \neq 7$, then $A_{df} = A_1$; otherwise $A_2$ is calculated as follows
   $A_2 = h_2 i_2 j_2 k_2 l_2 m_2 n_2 \leftarrow A_1 + h_1 i_1 j_1 k_1 l_1 m_1 + 1$
   If $n_2 \neq 7$, then $A_{df} = A_2$; otherwise $A_3$ is calculated from $A_2$ in the same manner in which $A_2$ was calculated from $A_1$. This calculation is iterated until a modification finally produces an address having a least significant octal digit different from seven. This iterative process can be represented in generalized terms as:
   $A_i + 1 \leftarrow A_i + h_i i_i j_i k_i l_i m_i + 1$ and $A_{df} \leftarrow A_{i+1}$ when $n_{i+1} \neq 7$. Note that this iterative process assures that $A_{df}$ will never have its least significant octal digit equal to seven.

B. Calculation of $A_c$ and CN, the addresses of a word location and a character location respectively for storing an error correcting character:

1. If $A_{df}$ is in an even module, $A_c \leftarrow A_{df} +$ (module size)$_8 - n_{df} + 7$
2. If $A_{df}$ is in an odd module, $A_c \leftarrow A_{df} -$ (module size)$_8 - n_{df} + 7$. Note that in the preferred embodiment $A_{df}$ [16:1] = 1 when $A_{df}$ is in an odd module and $A_{df}$ [16:1] = 0 when $A_{df}$ is in an even module. Note also that $A_c$ always has its least significant octal digit equal to seven, whereas $A_{df}$ never has its least significant octal digit equal to seven. Thus the locations for storing the memory words are disjoint from the locations for storing the error correcting characters.
3. $CN = n_{df}$ Consider now two specific computations using these algorithms. In the first example the raw address is equal to $(0000027)_8$ and in the second example the raw address is equal to $(1000025)_8$. In both examples the module size is equal to $(0200000)_8$ or, equivalently, 65,536 locations per module.

First example

I. (Ao) (0 0 0 0 0 2 7) +(0 0 0 0 0 0 2)
$A_1$ = (0 0 0 0 0 3 1)

Here $n_1$ is equal to 1. Since $n_1$ is not equal to 7 no iterations are required and $A_1$ is used as $A_{df}$ or the actual address for the memory word. It should be noted that $A_{df}$ is in an even module since $A_{df}$[16:1] is a '0'.

II. $A_{df}$ (0 0 0 0 0 3 1) (module size)$_8$+(0 2 0 0 0 0 0)
$-n_{df}$ −( 1)
+7 ( 7)
$Ac$ = (0 2 0 0 0 3 7)

III. $CN$ =1

Second example

I. $Ao$ 1 0 0 0 0 2 5 +0 1 0 0 0 0 2
$A_1$ 1 1 0 0 0 2 7

Here $n_1$ is equal to 7. Therefore a second calculation is made, $A_1$ 1 1 0 0 0 2 7 +0 1 1 0 0 0 2
+1 +0 0 0 0 0 0 1 $A_2$ = 1 2 1 0 0 3 2

Since $n_2$ is equal to 2, no further interations are required and $A_2$ is used as $A_{df}$. It should be noted that here $A_{df}$ is in an odd module since $A_{df}$[16:1] is a '1'.

II $A_{df}$ 1 2 1 0 0 3 2
−(module size)$_8$− 0 2 0 0 0 0 0
$-n_{df}$ − 2
+7 + 7
$Ac$ = 1 0 1 0 0 3 7

III. $CN$ = 2

Detailed Description of Construction and Operation

Figure 2:
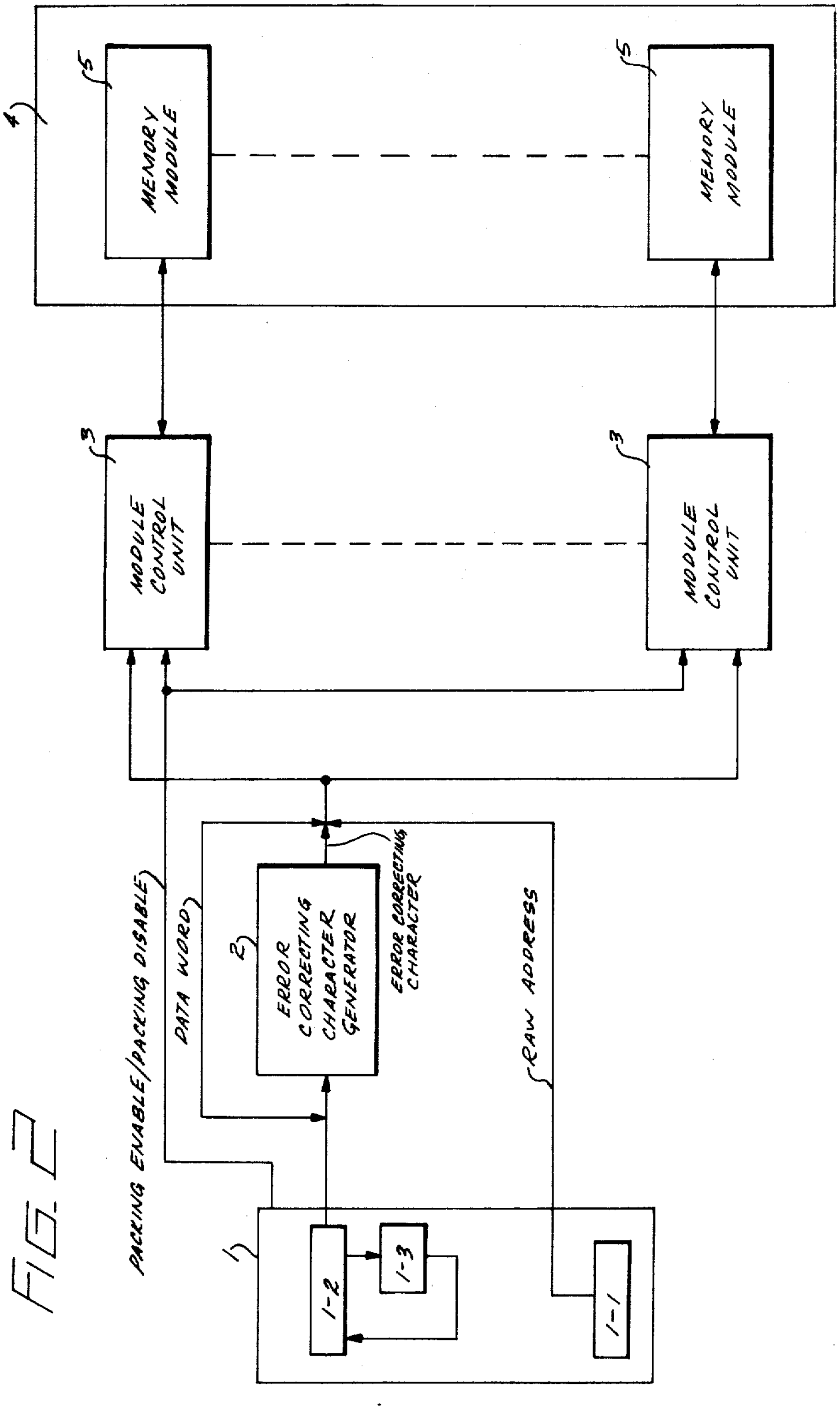
FIG. 2 is a block diagram of a data processing system having a plurality of memory modules and embodying the present invention.

In FIG. 2, a source 1 sequentially exchanges information with an addressable memory 4. Source 1 could be a central processing unit, an input/output control unit, multiplexor, or the like. Source 1 has a register 1—1 for storing each of a sequence of raw addresses and a register 1–2 for storing information to be exchanged with memory 4. Source 1 also produces by means not shown either a packing enable signal or a packing disable signal to indicate whether or not error correcting characters should be used. Also shown within source 1 is error detecting and correcting circuitry 1–3 which is responsive to associated data words and error correcting characters read from memory 4 to correct errors which may occur in the data words. Various means for detecting and correcting a word in error based on the value of an error correcting character are well known in the computer art and the details thereof need not be given for a complete understanding of the present invention.

A description of the techniques employed in correcting errors in words encoded according to a Hamming Code is contained in pp. 84–86 of a book entitled DIGITAL COMPUTER DESIGN FUNDAMENTALS by Yaohan Chu, published by the McGraw-Hill Book Co. Inc. in 1962. A detailed description of circuitry used for correcting words according to a BCH Code is contained in U.S. Pat. No. 3,418,629 by Robert T. Chien and entitled DECODERS FOR CYCLIC ERROR-CORRECTING CODES.

Memory 4 is partitioned into a plurality of independently operating memory modules 5, each of which has a plurality of addressable locations. Each memory module 5 is coupled to an associated module addressing and control unit 3. Each module control unit 3 receives the raw addresses produced by source 1 and initiates reading and writing cycles in its associated memory module 5. Since the memory modules 5 are independently operating, information can be written into or read from a pair of modules simultaneously.

When a data word is to be written into memory 4, source 1 generates a memory write request signal (MWS) which is transferred to error correcting character generator 2 and to each module control unit 3. In response to the MWS signal and the data word from source 1, generator 2 produces an error correcting character which is transferred along with the data word to each module control unit 3. If source 1 is providing a packing enable signal, the module control units 3 modify the raw address to produce two modified addresses.

One of these modified addresses is used for selecting a location for storing the data word and the other is used for selecting a location for storing the error correcting character. Although the invention is not limited thereto these modified addresses are produced in a manner such that they will specify locations in two different memory modules. Each module control unit 3 tests the modified addresses to determine whether either one specifies a location within its associated memory module 5. In effecting this test one module control unit 3 will find that the modified address for the data word is in its associated memory module 5 and therefore will initiate a write cycle therein. Similarly, another module control unit 3 will find that the modified address for the error correcting character is in its associated memory module 5 and therefore will initiate a cycle which writes the error correcting character therein.

If source 1 is providing a packing disable signal, the module control units do not modify the raw address. Instead the data word is written into the memory location specified by the raw address and the error correcting character is not stored.

When a data word is to be read from memory 4, source 1 generates a memory read request signal (MRS) which is transferred to each module control unit 3. If source 1 is providing a packing enable signal, the module control units 3 modify the raw address to produce two modified addresses in the same manner as they produce modified addresses in response to write requests. Likewise, each module control unit 3 tests the modified addresses to determine whether either one specifies a location within its associated memory module 5. One module control unit 3 will find that a modified address for a data word is in its associated memory module 5 and will therefore initiate a read cycle therein. Similarly, another module control unit 3 will find that a modified address for an error correcting character is in its associated memory module 5 and therefore will initiate a read cycle therein.

It will now be seen that the module control units 3 form means for associating (by way of addresses) a common memory location with a plurality of other interspersed memory locations. The characters are packed into the common memory locations and the words are stored into the memory locations associated with the common memory location into which the associated character is stored.

A specific embodiment of the present invention is in a data processing system having a memory 4 which is partitioned into 32 independently operating modules 5.

A five bit address field is therefore sufficient to select an individual memory module 5 for access. Each memory module 5 has 65,536 addressable locations. A 16-bit address field is therefore sufficient to select for access an individual location within a memory module 5. Thus, source 1 produces a 21-bit (16 + 5) raw address in order to specify for access a particular location of memory 4.

Each location has 42-bit storing containers such as magnetic cores, thin films, or the like. Thus each location can store a 42-bit wide data word or up to seven error correcting characters, each six bits wide.

Figure 3:
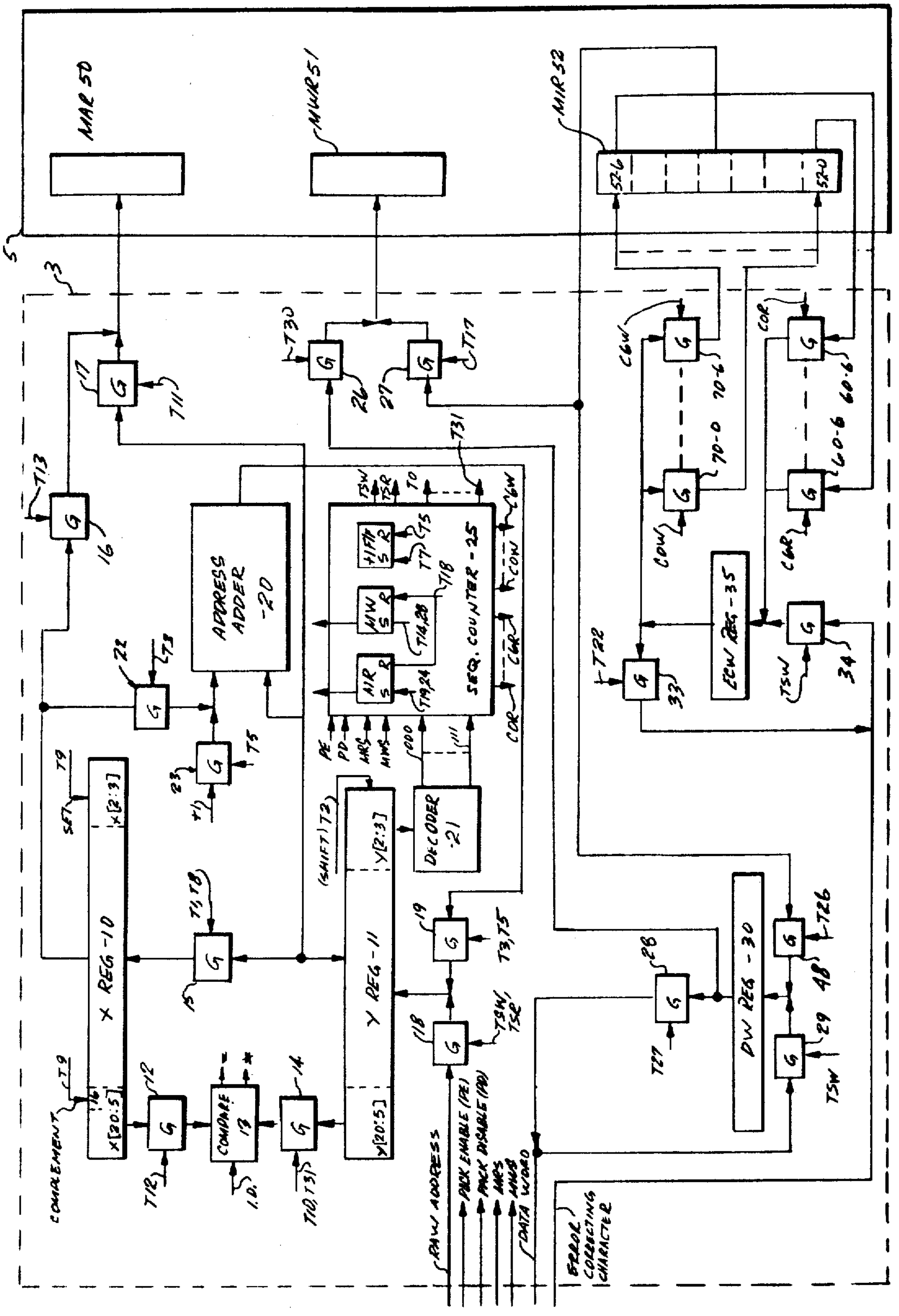
FIG. 3 is a block diagram showing the construction of one of the memory modules and associated module control units of FIG. 2.

Consider now FIG. 3 which shows in block diagram form, the construction of one of the 32 memory modules 5 and its associated module control unit 3.

Although the invention is not limited thereto, in the preferred embodiment, each memory module 5 is of the type described and claimed in U.S. Pat. No. 3,599,159 which issued on application Ser. No. 27,190, filed Apr. 9, 1970 entitled DIGITAL MEMORY WITH AUTOMATIC OVERWRITE PROTECTION, by B. A. Creech et al. and assigned to the assignee of this invention. Each memory module 5 uses a read/restore cycle during operations in which information is read therefrom and uses a read/write cycle during operations in which information is written therein. In FIG. 3, only a memory address register MAR-50, a memory read register MWR-51 and a memory information register MIR-52 are shown in the module 5. The core memory and its associated circuitry are not specifically shown but are understood to be present within module 5. Each memory access involves a read phase in which information is destructively read from a selected location followed by either a restore phase or a write phase. During a read phase, 42 bits of information are read from a selected location and transferred to MIR-52. During a restore phase or a write phase, 42 bits of information are transferred from MWR-51 and written into the selected location.

MIR-52 comprises seven subregisters 52–0 through 52–6. Each of these subregisters has six flip-flops for storing the six bits of an error correcting character.

MAR-50 is provided for storing the address signals which select for access one of the 65,536 locations of module 5. To that end MAR-50 has 16 flip-flops for storing a 16-bit binary coded address signal.

Consider now the major blocks shown within module control unit 3. X register 10 and Y register 11 are 21 bit wide registers which are used for temporary storage of address signals during the execution of the address modification algorithm. X register 10 stores addresses comprising a five bit field which is referred to as X[20:5] and which serves to indicate whether the address lies within the associated memory module 5. A 16 bit field referred to as X[15:16] specifies a relative location within a selected memory module. The part of X register 10 storing the three bit field X[2:3] has a set input; thus that field can be set to '111' during the execution of the algorithm. Also the part storing the one bit field X[16:1] has a complement input; thus that field can be complemented during execution of the algorithm.

Y register 11 also stores a five bit field which serves to specify a memory module 5 and a 16 bit field which serves to specify a relative location within the selected memory module 5. Y register 11 is a shift register and responds to an input shown as T2 to shift the address it stores by one octal place. One part of Y REGISTER 11 stores the three bit field Y[2:3] which serves to specify a sublocation for storing an error correcting character.

An address adder 20 is provided for adding together the addresses stored in X register 10 and Y register 11. Address adder 20 also increments or adds one to the address stored in Y register 11 during the iterative part of the address modification algorithm. The sum produced by address adder 20 is coupled back to Y register 11 so that the sum or modified address will replace the address initially stored therein.

Compare circuit 13 is provided to enable the module control unit 3 to determine whether an access should be made to its associated memory module 5. To that end the 32 different module control units have 32 different identification tags (ID). Compare circuit 13 produces an indication of whether module specifying fields X[20:5] and Y[20:5] are equal or not equal to the particular ID.

A DW register 30 provides temporary storage of the 42 bit words which are exchanged between the memory module 5 and the source 1.

An ECW register 35 provides temporary storage of the six bit error correcting characters which accompany the 42 bit words when the packing feature is used.

A sequence counter and control unit 25 is a conventional timing and control unit which generates a sequence of control signals for controlling the overall operation of module control unit 3.

Also shown within module control unit 3 are a plurality of gates which respond to the control signals from sequence counter 25 to transfer binary fields from register to register. The detailed operation of these gates will be explained in connection with the description of the flow chart of FIG. 4.

Consider now the block diagram of FIG. 3 together with the flow chart of FIG. 4 which illustrates the operations involved in exchanging information with memory 4.

Figure 4A:
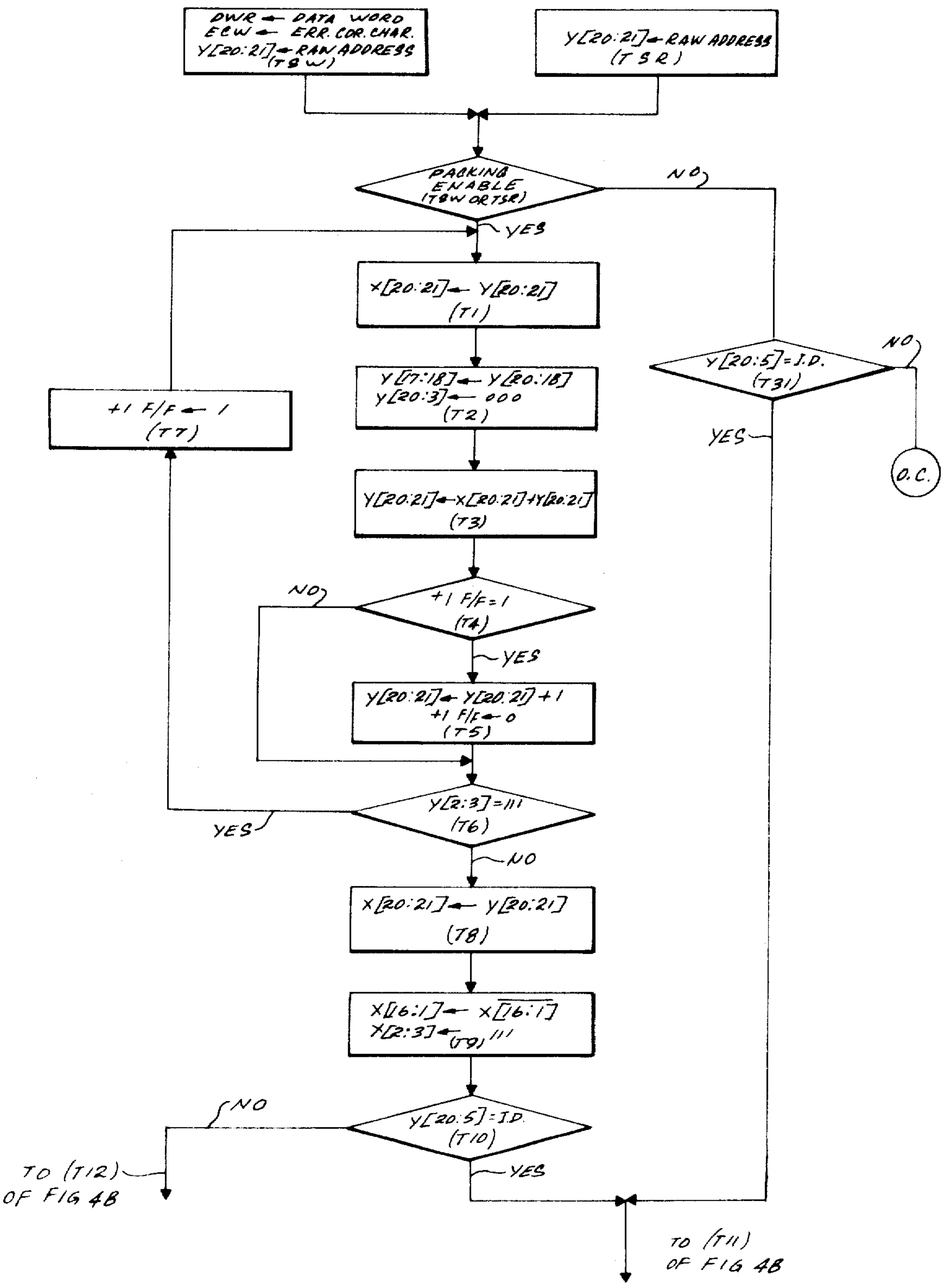
FIG. 4 comprises FIGS. 4A and 4B and is a flow diagram showing the sequence of operation involved in exchanging information with the memory module shown in FIG. 3.

Consider first the operations involved in writing information into memory 4. First, source 1 produces an MWS signal to request an access to memory 4. This signal activates the operation of each module control unit. Although the operation of only one module control unit is given below it should be kept in mind that the same operations are taking place in each of the other module control units. The MWS signal is transferred to the sequence counter 25 in each module control unit 3. If sequence counter 25 is in its initial state (TO) it responds to the MWS signal to produce control signal TSW. The signal TSW is applied to gates 18, 29, and 34. In response, gage 18 in each module control causes a raw address received from source 1 to be transferred into Y register 11. This operation is represented in FIG. 4A as Y[20:21] ← Raw Address. Gate 29 in each module control causes a data word which is to be written into memory 4 to be temporarily stored in DW Reg. 30. Gate 34 causes an error correcting character which was produced by generator 2 to be temporarily stored in ECW Register 35. These operations are represented in FIG. 4A as DWR ← Data Word and ECW ← Err. Cor. Char., respectively.

At the same time that the above-mentioned words are transferred into module control unit 3, sequence counter 25 makes a test to determine whether the packing feature is to be used. To that end, the packing enable (PE) signal and the packing disable (PD) signal are applied to sequence counter 25. If the packing enable (PE) signal is a '1' then sequence counter 25 will count to the next state and produce control signal T1. If the packing disable (PD) signal is a '1' then sequence counter 25 will branch to a different count and produce the control signal T31.

Control signal T1 is applied to a gate 15 which responds to cause the contents of Y register 11 to be transferred into X register 10 (i.e., X[20:21]← 27Y[20:21]). At this point then both X register 10 and Y register 11 store the raw address received from source 1.

Following control signal T1, sequence counter 25 next produces control signal T2. Control signal T2 is applied to Y register 11 to cause its contents to be shifted to the right by one octal place (i.e., Y[17:18]← 27Y[20:18] and Y[20:3] ← 000). Thus at this point X register 10 is still storing the raw address while Y register 11 now stores the raw address shifted by one octal place.

Next, sequence counter 25 produces control signal T3. This control signal is applied to a gate 22 and a gate 19. Gate 22 then causes the raw address stored in X register 10 to be applied to one input of address adder 20. The other input of address adder 20 is derived from Y register 11. Address adder 20 adds the two addresses together and the sum is coupled back to Y register 11 through the gate 19 (i.e., Y[20:21] ← X[20:21] + Y[20:21]). Thus it can be seen that the first part of the above-described algorithm has been carried out.

After control signal T3, sequence counter 25 produces control signal T4 and effects a test to determine whether it has entered the iterative part of the algorithm. This test is accomplished by examining the output of one of the internal bistable devices within sequence counter 25. This internal bistable is referred to as the +1 F/F. A '1' state output of the +1 F/F indicates that the iterative part has been entered and a '0' state output indicates that it has not. Initially, the +1 F/F is in its '0' state. Since the +1 F/F is not in its '1' state, sequence counter 25 skips one state and next produces control signal T6.

During control signal T6, sequence counter 25 effects a test to determine whether it is necessary to enter the iterative part of the algorithm. As shown in FIG. 4A, the three least significant bits stored in Y register 11 are tested to determine whether they are all equal to '1'. This test corresponds to the test made in the above-mentioned algorithm to determine whether $n_1$ is equal to the octal number 7. This test is accomplished by the circuit blocks shown in FIG. 3 in the following manner. Decoder 21 has an input coupled to receive the Y[2:3] output of Y register 11. Decoder 21 has eight different outputs labelled 000 through 111 which correspond to the eight possible states of Y[2:3] and which are coupled to sequence counter 25. Decoder 21 produces a '1' signal to one of its eight output lines which corresponds to the current state of Y[2:3] and a '0' signal on each of the other seven.

When the test made during control signal T6 indicates that Y[2:3] is equal to '111' sequence counter 25 goes to its next state and produces control signal T7. During control signal T7 the +1 F/F is set to a '1' to indicate that the iterative part of the algorithm has been entered. Following control signal T7, sequence counter 25 loops back to produce control signal T1 again. Thus sequence counter 25 will repeat the same steps from T1 through T4 again. However, now when the test is made at T4, sequence counter 25 will find that the +1 F/F is in its '1' state. Under these circumstances, sequence counter 25 produces control signal T5. A gate 23 responds to control signal T5 to cause a +1 input to be applied to one input of address adder 20. The other input of address adder 20 is still derived from Y register 11. Control signal T5 is also applied to the gate 19 which causes the output of address adder to be transferred into Y register 11. Thus, during control signal T5 the contents of Y register 11 are incremented by one (i.e., Y[20:21] ← Y[20:21]+1). During control signal T5 the +1 F/F is reset to indicate that an iteration of the algorithm has been completed. This operation is represented in FIG. 4A as +1 F/F ← 0.

After control signal T5 sequence counter 25 produces control signal T6 again. During control signal T6 sequence counter 25 makes a test to determine whether another iteration is required. Sequence counter 25 will flow through the loop defined between control signals T1 and T7 until the Y[2:3] field does not equal '111'. Thus at the end of the iterative procedure, Y register 11 will store a 21 bit address modified from the raw address in accordance with the algorithm so that the least significant octal digit differs from seven. It is this modified address which specifies the actual location in memory 4 into which the data word will be written.

Sequence counter 25 next produces control signal T8 which is applied to gate 15 to cause the contents of Y register 11 to be transferred into X register 10. Now module control unit 3 modifies the contents of X register 10 so that it will specify the location of memory 4 into which the error correcting character will be stored. To that end, sequence counter 25 produces control signal T9 which is applied to two parts of X register 10. The part of X register 10 which stores X[2:3] is set to '111' and the part which stores X[16:1] is complemented (i.e., X[16:1] ← X[16:1] and X[2:3] ← 111). The complementing operation is equivalent to the steps of the above-mentioned algorithm whereby (module size)$_8$ is either added or subtracted and the setting operation is equivalent to the algorithm step of subtracting $n_{df}$ and adding the octal number 7.

At this point in the sequence of operation X register 10 and Y register 11 store respectively the actual addresses of memory 4 into which the error correcting character and the data word will be written.

Now module control unit 3 effects a test to determine whether the actual address for the data word specifies a location within its associated memory module 5. To that end, sequence counter 25 produces control signal T10 which is applied to a gate 14. In response gate 14 applies the Y[20:5] output of Y register 11 to compare circuit 13. This output is compared against the I.D. for that particular module control unit 3 by compare circuit 13 and the result of the comparison is indicated by a '1' signal appearing on either the = or ≠ output. The = and ≠ outputs are coupled (by lines not shown) to sequence counter 25.

Figure 4B:
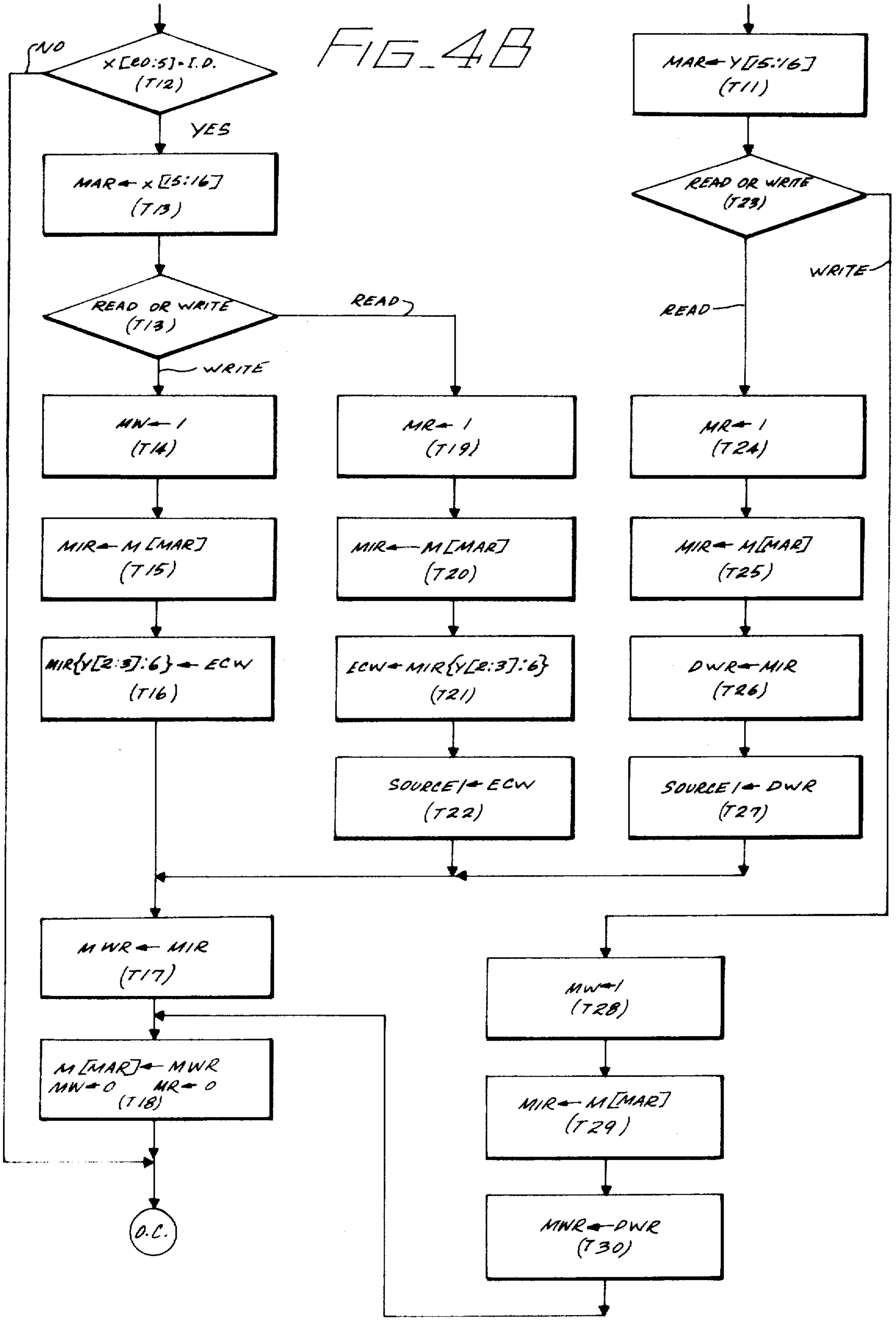

If compare circuit 13 produces a '1' on the = line during T10, sequence counter 25 responds by going to its next state and produces control signal T11 as shown in FIG. 4B. Control signal T11 is applied to a gate 17 which responds by transferring the Y[15:16] part of Y register 11 into the MAR-50 register of the associated memory module 5.

Next sequence counter 25 produces control signal T23 and effects a test of whether a read or a write operation is called for. If the MWS signal has been received from source 1 thereby indicating a write operation, sequence counter 25 branches to produce control signal T28 which sets a flip-flop therein shown as MW (i.e., MW ← 1). The MW flip-flop output signal activates conventional memory module write control circuitry (not shown).

Next sequence counter 25 produces control signal T29 during which the read phase of the write cycle is effected (i.e., MIR ← M[MAR]). Then sequence counter 25 produces control signal T30 which causes the data word stored in DW Reg. 30 to be transferred through a gate 26 into MWR-51. Subsequently sequence counter 25 produces control signal T18 which resets the MW flip-flop. During control signal T18 the word stored in MWR-51 is written into the location selected by MAR-50 during control signal T29 (i.e., M[MAR] ← MWR). Note that FIG. 4B shows that this completes the operation for this particular module control unit 3 by the symbol O.C. Thus the particular one of the 32 module control units 3 which carries out the operation of writing the data word is not involved in the writing of the error correcting character. Instead, one of the other module control units 3 will carry out this task and therefore both the data word and the error correcting character can be written into different locations of memory 4 at the same time.

If compare circuit 13 produces a '1' on the ≠ line during control signal T10, sequence counter 25 skips instead to a different state and produces control signal T12. Now module control unit 3 effects a test to determine whether the actual address for the error correcting characters specifies a location within its associated module 5. To that end, control signal T12 is applied to a gate 12 which responds by transferring the X[20:5] output of X register 10 to compare circuit 13. This output is compared against the I.D. for that particular module control unit 3 in the same manner as described above. If compare circuit 13 produces a '1' on its ≠ output during T12, the operation for this particular module control unit 3 is completed. Of the 32 module control units 3, 30 will find that the actual addresses are not in their associated memory module 5; one will find that the actual address for the data word is in its associated memory module 5 and another one will find that the actual address for the error correcting character is in its associated memory module 5.

If compare circuit 13 produces a '1' on its = output during T12, sequence counter 25 goes to its next state and produces control signal T13. Control signal T13 is applied to a gate 16 which responds by transferring the X[15:16] part of X register 10 into the MAR-50 register of the associated memory module 5. During T13 a test is made to determine whether a read or a write operation is called for. If the MWS signal is a '1' thereby indicating a write operation, sequence counter 25 next produces control signal T14 which is applied to set the MW flip-flop. The MW signal activates the conventional write control circuitry and a read/modify/write cycle is initiated. During this cycle, sequence counter 25 produces the control signals T15 through T18.

During T15 the read phase of the cycle occurs wherein the contents of the addressed location are read out and placed into the MIR-52 register of memory module 5 (i.e., MIR ← M[MAR]). During T16, the error correcting character is transferred into one of the subregisters of MIR-50, overwriting whatever happened to be stored therein. To that end the output of the ECW 35 register is coupled to seven gates 70-0 through 70-6 (not all shown). The outputs of each of these seven gates is coupled to one of the seven subregisters 52-0 through 52-6 of MIR-52. During T16 one of the seven gates 70 will be enabled by a control signal from sequence counter 25 and will therefore transfer the error correcting character into MIR-52.

Recall from the above-described algorithm that the character number CN is equal to the least significant octal digit of the actual address for the data word. At this point in the sequence of operation Y register 11 is storing the actual address for the data word. Thus the particular subregister of MIR-52 into which the error correcting character is gated is selected on the basis of the octal value of Y[2:3]. To that end, decoder 21 produces a '1' signal on one of its eight output lines 000 through 111 corresponding to the octal value of Y[2:3]. During T16 sequence counter 25 responds to the output of decoder 21 to produce a '1' signal on one of seven lines COW through C6W and a '0' signal on the remaining six lines. Sequence counter 25 produces a '1' on the line COW when Y[2:3] stores '000'; a '1' on line C1W when Y[2:3] stores '001'; etc. The seven output lines COW through C6W are coupled to gates 70-0 through 70-6 respectively. Consider a specific example in which Y[2:3] is equal to '100', the equivalent of octal 4. Decoder 21 will produce a '1' on the output line '100' and a '0' on its other seven output lines. Sequence counter 25 will produce a '1' on its output line C4W and a '0' on its output lines COW through C3W, C5W, and C6W. Gate 70-4 will be enabled and gates 70-0 through 70-3, 70-5 and 70-6 will not. Thus the error correcting character will be transferred from ECW register 35 into the 52-4 subregister of MIR-52. The operation occurring during T16 is represented in FIG. 4 as MIR[Y[2:3]:6] ← ECW.

After T16, sequence counter 25 produces control signal T17 which is applied to a gate 27. In response, gate 27 causes the contents of MIR-52 to be transferred into MWR-51. At this point MWR-51 now has stored therein the one new error correcting character along with up to six old error correcting characters and the write phase of the cycle can commence. Thus during T18 the contents of MWR-51 are written into the location of memory module 5 selected by MAR-50, thereby completing the operation.

Consider now the sequence of operation when the packing feature is not used. In this event sequence counter 25 will branch from T0 to produce control signal T31 which is applied to the gate 14. Thus gate 14 will enable compare circuit 13 to make a test to determine if the address stored in Y register 11 specifies a location in the associated memory module 5. Of the 32 module control units 3 only one will be involved in actually writing the data word into memory 4. Thus 31 of module control units 3 will complete their operation after the test which is effected during T31. In the one module control unit which is involved, sequence counter 25 branches to produce control signal T11. The operational flow at and from T11 in this case is the same as the flow described above.

The sequence of operation which occurs during a memory read is substantially the same as the memory write operation. In particular, the part of the operation in which the actual addresses are computed according to the algorithm is identical. The chief difference in operation resides in that during a memory read the data word and its associated error correcting character are transferred in the direction from memory 4 to source 1 instead of the opposite direction as in the memory write operation. Thus sequence counter 25 responds to a memory read request signal from source 1 (indicated by MRS) to produce a TSR signal instead of a TSW signal. Like the TSW signal, the TSR signal is applied to gate 18 to cause the raw address to be transferred into Y register 11. Unlike the TSW signal, however, the TSR signal is not applied to gates 29 and 34 which control the transfer of the data word and the error correcting character respectively.

Also the sequence of operation following T13 and T23 in a read operation differs from that of a write operation.

Consider now the operations following T13. First, sequence counter 25 branches to produce control signal T19 which sets a MR flip-flop shown within sequence counter 25. The MR flip-flop output signal activates the memory module read control circuitry.

Next sequence counter 25 produces control signal T20 during which the read phase is effected (i.e., MIR·7M[MAR]). Then sequence counter 25 produces control signal T21. During T21, one of the seven error correcting characters now stored in MIR-52 is transferred into ECW register 35. To that end, each of the seven subregisters of MIR-52 has its output coupled to one of seven gates 60-0 through 60-6. During T21, one of the seven gates 60 will be enabled by a control signal from sequence counter 25 and will therefore transfer an error correcting character to ECW register 35.

As in the case of a memory write operation, the particular subregister of MIR-52 from which the error correcting character is gated is selected on the basis of the decoded octal value of X[2:3]. During T21 sequence counter 25 responds to the output or decoder 21 to produce a '1' signal on one of seven lines COR through C6R and a '0' on the remaining six lines. The seven output lines C0R through C6R are coupled to gates 60-0 through 60-6 respectively. Thus one of these gates will be enabled during T21 and an error correcting character will be transferred into ECW register 35 (i.e., ECW 7MIR[Y[2:3]:6]). Next, sequence counter 25 produces control signal T22 which is applied to a gate 33 to cause the read-out error correcting character to be transferred to source 1 (i.e., source 1 ← ECW). The operation following T22 is identical to the write operation following T16.

Consider now the operations following T23. First, sequence counter 25 produces control signal T24 which sets the MR flip-flop. Then, sequence counter 25 produces control signal T25 during the read phase of the read cycle (i.e., MIR ← M[MAR]). Then sequence counter 25 produces control signal T26 which is applied to a gate 48 connecting MIR-52 to DW register 30. Thus the data read from the addressed location is transferred into DW register 30 (i.e., DWR ← MIR). Then sequence counter 25 produces control signal T27 which is applied to a gate 28 connecting the DW register 30 to source 1 and the data is transferred thereto (i.e., source 1 ← DWR). The operation following T27 is the same as the above-described operation following T16.

It should be noted that a number of modifications could be made to the above-described preferred embodiment without departing from the scope of this invention. For example, an associative memory could be used for storing the memory words and the packed together error correcting characters instead of the addressable memory of the preferred embodiment. As another example, the characters which are associated with the memory words and which are packed together in storage locations could be parity bits or tag fields or the like.

What is claimed is:

1. A data processing system comprising a memory having a plurality of storage locations; means for sequentially receiving a plurality of information items to be stored into the memory, each information item including a word and an associated character; means for storing each received information item into the memory, the storing means including means for selecting a different one of a first plurality of the storage locations for storing each of a sequence of received words and including means for sequentially selecting the same one of a second plurality of storage locations for storing a plurality of sequentially received characters respectively associated with the plurality of words stored in the first plurality of storage locations so as to pack such characters together in the same storage location.

2. A data processing system according to claim 1 comprising a source for providing addresses, the storing means including means responsive to a memory address for accessing a storage location, circuitry for converting a plurality of provided addresses to the same memory address, and means for providing to the accessing means said same address for identifying the actual storage location for storing the associated characters.

3. A data processing system according to claim 1 comprising means operative for reading out a word form one storage location and its associated character from said same storage location.

4. A data processing system according to claim 1 wherein the memory comprises a plurality of addressable modules each having a plurality of addressable locations, means enabling substantially simultaneous access to a pair of said modules causing access to a location in one module for a memory word and causing access to a location in the other module for the word and associated character.

5. A data processing system according to claim 1 further including means for selectively providing a packing disable signal, and the selecting means being responsive the packing disable signal to select storage locations in said second plurality for storing words so as to make more storage locations available for storing memory words.

6. A digital data processing system comprising:

a memory system having a plurality of memory locations, each location for storing a binary coded word or a plurality of binary coded error correcting characters;

means for correcting an erroneous word in accordance with an error correcting character;

means for sequentially receiving a plurality of words and, in association with each word, an error correcting character;

means for accessing the memory system including means for sequentially storing a plurality of said received characters in one of said memory locations and for storing each received word in a different memory location from its associated character, means for retrieving from said memory system a word stored in a memory location thereof and the associated error correcting character from a different memory location; and means for providing the retrieved word and character to said correcting means.

7. A digital data processing system according to claim 6 wherein said memory system comprises a plurality of memory modules accessible substantially in parallel, said means for storing comprising means for storing a word in one memory module and its associated error correcting character in another memory module substantially in parallel, said retrieving means comprising means for retrieving a word from one memory module and its associated error correcting character from another memory module substantially in parallel.

8. A system according to claim 6 wherein the memory system includes means responsive to a memory address for selecting a memory location; and the means for accessing includes a source for providing addresses, circuitry responsive to each provided address for supplying to the memory system a memory address for a word and a memory address for an associated character.

9. A system according to claim 8 wherein the memory system comprises a plurality of addressable memory modules accessible substantially in parallel; and the circuitry for supplying memory addresses includes means for supplying a memory address to one memory module for selecting a location for a word and for supplying a memory address to a different memory module for a character.

10. In a data processing system, the combination comprising a memory having a plurality of addressable memory locations each having a predetermined number of bit cells, register means coupled to the memory for sequentially transferring words therebetween; means for producing associated error correcting characters for words to be stored in memory, means for correcting an erroneous word read from the memory in accordance with an error correcting character read from the memory; and memory accessing means for selecting and for writing into and reading from mutually exclusive locations of the memory words and the error correcting characters, the memory accessing means including means for sequentially selecting mutually exclusive subsets of the bit cells of one location for storing a plurality of error correcting characters.

11. The combination according to claim 10 wherein the memory comprises a plurality of independently operating memory modules and wherein the means for selecting memory locations includes means for simultaneously selecting a memory location for a word and a memory location for an error correcting character.

12. A digital data processing system comprising:

a memory system comprising a plurality of independently addressable memory modules each having addressable memory locations, each location for storing a binary coded word or a plurality of binary coded error correcting characters;

means for correcting an erroneous word in accordance with an error correcting character;

means for providing one of said words and, associated therewith, an error correcting character;

means for providing a first address;

means for converting said first address to second and third addresses for identifying respectively a memory location in one memory module for said provided word and a memory location in a different memory module for said provided associated error correcting character, said converting means forming the same third address for a plurality of different first addresses;

means for storing one of said provided words and an associated error correcting character in said memory system and comprising means for storing such word in a memory location identified by one of said second addresses and means for storing such associated error correcting character in a memory location identified by said third address; and means for reading a desired word and associated error correcting character from said memory system comprising means for reading out such desired word from the memory location identified by one of said second addresses and means for reading out such associated error correcting character from the memory location identified by one of said third addresses.

13. A method for transferring a word having a predetermined field length and an associated error correcting character having a shorter field length into and out of a memory having a plurality of addressable locations each of which has a predetermined number of bit cells sufficient to store the word, the method comprising the steps of producing an address pointing signal and a control signal indicating either a write or a read operation, modifying the pointing signal to produce an actual address signal for identifying a location as a word storage location for access in transferring the word, producing a different address signal for identifying a location as a character storage location for access in transferring the associated error correcting character, in accordance with said control signal respectively writing or reading said word and character into or out of the accessed locations.

14. The method as defined in claim 13 additionally comprising the steps of producing an indication of a subset of bit cells and controlling the writing of the character so that the character is written into the indicated subset.

15. A data processing system comprising a memory having a plurality of storage locations, means for sequentially receiving a plurality of words and associated with each word a character, means for associating certain of said storage locations together and means responsive to said associating means for packing together one at a time in a common storage location a plurality of said received characters and for storing said received words associated with each said packed character in other storage locations associated with said common storage location.

16. A data processing system according to claim 15 comprising means responsive to said associating means for reading out a word and its associated character from associated memory locations.

17. A data processing system according to claim 16 wherein said associating means comprises means for identifying one of a plurality of character positions in a common storage location, said packing means and reading means being responsive to said identification for respectively storing and reading in said identified storage location.

18. A data processing system according to claim 16 wherein there are a plurality of said common storage locations, each for storing a plurality of said characters, separated by a plurality of storage locations each for storing one of said words associated with one of said stored characters and said associating means is operative for associating each of said common storage locations with a separating storage location for each character stored in a common storage location.

* * * * *